(12) United States Patent
Kang et al.

(10) Patent No.: US 11,237,976 B2
(45) Date of Patent: Feb. 1, 2022

(54) MEMORY SYSTEM, MEMORY CONTROLLER AND META-INFORMATION STORAGE DEVICE

(71) Applicant: SK hynix Inc., Gyeonggi-do (KR)

(72) Inventors: Hye-Mi Kang, Gyeonggi-do (KR); Eu-Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 81 days.

(21) Appl. No.: 16/673,730

(22) Filed: Nov. 4, 2019

(65) Prior Publication Data

US 2020/0387456 A1 Dec. 10, 2020

(30) Foreign Application Priority Data

Jun. 5, 2019 (KR) .................. 10-2019-0066405

(51) Int. Cl.
*G06F 12/10* (2016.01)
(52) U.S. Cl.
CPC ........ *G06F 12/10* (2013.01); *G06F 2212/657* (2013.01)
(58) Field of Classification Search
CPC ...................................................... G06F 12/10
See application file for complete search history.

(56) References Cited

U.S. PATENT DOCUMENTS

| | | |
|---|---|---|
| 9,128,715 B2 | 9/2015 | Stenfort |
| 9,229,854 B1 | 1/2016 | Kuzmin et al. |
| 9,378,135 B2 | 6/2016 | Bennett |
| 9,400,749 B1 | 7/2016 | Kuzmin et al. |
| 9,547,360 B2 | 1/2017 | Park et al. |
| 9,927,994 B2 | 3/2018 | Byun |
| 10,157,004 B2 | 12/2018 | Michaeli |
| 10,198,198 B2 | 2/2019 | Machida |
| 10,229,051 B2 | 3/2019 | Hwang et al. |
| 10,860,228 B1 * | 12/2020 | Mulani .................. G06F 3/0634 |
| 2007/0283125 A1 | 12/2007 | Manczak et al. |

(Continued)

FOREIGN PATENT DOCUMENTS

| | | |
|---|---|---|
| KR | 10-2014-0065856 | 5/2014 |
| KR | 10-2018-0123192 | 11/2018 |

OTHER PUBLICATIONS

Office Action issued by USPTO for U.S. Appl. No. 16/734,075 dated Mar. 3, 2021.

(Continued)

*Primary Examiner* — Ryan Bertram
(74) *Attorney, Agent, or Firm* — IP & T Group LLP

(57) ABSTRACT

Embodiments of the disclosure relate to a memory system, a memory controller and a meta-information storage device. By providing a memory device configured to store mapping information between a logical address and a physical address, a memory controller configured to control the memory device and control a memory area in which mapping segments including some of the mapping information are stored and a meta-information storage device configured to store meta-information on the memory area, it is possible to provide a memory system, a memory controller and a meta-information storage device capable of processing a command received from a host as quickly as possible even when an SPO occurs.

20 Claims, 12 Drawing Sheets

(56) References Cited

U.S. PATENT DOCUMENTS

| | | | |
|---|---|---|---|
| 2008/0189485 A1* | 8/2008 | Jung | G11C 16/349 711/115 |
| 2012/0110259 A1 | 5/2012 | Mills et al. | |
| 2013/0067125 A1* | 3/2013 | Rizzo | G06F 3/0631 710/38 |
| 2013/0268741 A1 | 10/2013 | Daly et al. | |
| 2013/0290571 A1* | 10/2013 | Rizzo | G06F 3/067 710/19 |
| 2014/0215129 A1* | 7/2014 | Kuzmin | G06F 12/0246 711/103 |
| 2015/0331624 A1* | 11/2015 | Law | G06F 12/0246 711/103 |
| 2016/0070474 A1* | 3/2016 | Yu | G06F 3/064 711/103 |
| 2017/0038973 A1 | 2/2017 | Takano | |
| 2017/0109089 A1* | 4/2017 | Huang | G06F 3/0688 |
| 2017/0357572 A1 | 12/2017 | Okubo et al. | |
| 2018/0039578 A1 | 2/2018 | Yun et al. | |
| 2018/0081569 A1* | 3/2018 | Kan | G06F 12/121 |
| 2018/0121109 A1* | 5/2018 | Li | G06F 3/0611 |
| 2018/0121121 A1 | 5/2018 | Mehra et al. | |
| 2018/0239726 A1 | 8/2018 | Wang et al. | |
| 2019/0004944 A1* | 1/2019 | Widder | G06F 12/0292 |
| 2019/0079859 A1* | 3/2019 | Li | G11C 16/3495 |
| 2019/0087125 A1 | 3/2019 | Matsumoto et al. | |
| 2019/0108131 A1 | 4/2019 | Lee et al. | |
| 2019/0129838 A1* | 5/2019 | Yoshida | G06F 12/0253 |
| 2019/0266079 A1 | 8/2019 | R et al. | |
| 2019/0384506 A1* | 12/2019 | Shivanand | G06F 3/064 |
| 2020/0065259 A1* | 2/2020 | Byun | G06F 12/1009 |
| 2020/0225875 A1* | 7/2020 | Oh | G06F 3/0659 |
| 2021/0056021 A1 | 2/2021 | Parry et al. | |

OTHER PUBLICATIONS

Office Action issued by the USPTO for U.S. Appl. No. 16/681,076 dated Apr. 14, 2021.

Office Action issued by the USPTO for U.S. Appl. No. 16/841,431 dated Jul. 28, 2021.

Office Action issued by the USPTO for U.S. Appl. No. 16/850,929 dated Aug. 25, 2021.

* cited by examiner

MEMORY SYSTEM, MEMORY CONTROLLER AND META-INFORMATION STORAGE DEVICE

CROSS-REFERENCE TO RELATED APPLICATION

The present application claims priority under 35 U.S.C. 119(a) to Korean Patent Application No. 10-2019-0066405, filed on Jun. 5, 2019, which is incorporated herein by reference in its entirety.

BACKGROUND

1. Technical Field

Various embodiments generally relate to a memory system, a memory controller and a meta-information storage device.

2. Related Art

A memory system stores data based on a request of a host, such as a computer, a mobile terminal such as a smartphone and a tablet, or any of various other electronic devices. The memory system may be of a type that stores data in a magnetic disk, such as a hard disk drive (HDD), or of a type that stores data in a nonvolatile memory, such as a solid state drive (SDD), a universal flash storage (UFS) device and an embedded MMC (eMMC) device.

The memory system may further include a memory controller for controlling a memory device. The memory controller may receive a command from the host, and may perform or control an operation for reading, writing or erasing data with respect to a volatile memory or a non-volatile memory in the memory system, based on the received command.

In the case of the conventional memory system, in order to perform the read, write or erase operation described above, mapping information between a logical address corresponding to a command received from the host and a physical address is referred to.

In this regard, the time during which the mapping information between the logical address and the physical address is referred increases due to various factors. Therefore, there is a need for a method capable of quickly processing a command received from the host. Even when an issue such as a sudden power-off (SPO) occurs, the memory system should still be able to quickly process a command received from the host.

SUMMARY

Various embodiments are directed to a memory system, a memory controller and a meta-information storage device capable of processing a command received from a host as quickly as possible even when an SPO occurs.

Also, various embodiments are directed to a memory system, a memory controller and a meta-information storage device capable of allowing a host to quickly refer to necessary mapping information.

In one aspect, embodiments of the disclosure may provide a memory system including: a memory device configured to store data at a physical address corresponding to a logical address of a host, and store mapping information between the logical address and the physical address; a memory controller configured to control the memory device and a memory area in which mapping segments including some of the mapping information are stored; and a meta-information storage device configured to store meta-information on the mapping segments stored in the memory area.

The memory controller may control synchronization between the mapping segments stored in the memory area and the mapping information.

The memory area may be disposed externally to the memory system.

The meta-information storage device may include a nonvolatile memory capable of reading and writing in a byte unit.

The memory controller may update the meta-information when the mapping information is updated.

The memory controller may update the meta-information when a command instructing an operation for the mapping segments is received from the host.

The memory controller may update information on an access count for each of the mapping segments, which is included in the meta-information.

The memory controller may update information on parts of the mapping information, which are included in the mapping segments, which is included in the meta-information.

The memory controller may update information on synchronization of each of sub areas included in the memory area, which is included in the meta-information.

The memory controller may generate flag information indicating whether the meta-information is being updated, and may store the flag information in the meta-information storage device.

The memory controller may check the flag information, and when it is determined that the flag information indicates that the meta-information is being updated, may transmit a signal which instructs an operation of resetting the memory area, to the host.

In another aspect, embodiments of the disclosure may provide a memory controller including: a memory interface configured to communicate with a memory device; and a control circuit configured to control the memory device and a memory area.

The memory device may store data at a physical address corresponding to a logical address of a host, and may store mapping information between the logical address and the physical address.

The memory area may store mapping segments including some of the mapping information, and may be disposed externally to a memory system that includes the control circuit and the memory device.

The control circuit may control synchronization between the mapping segments stored in the memory area and the mapping information, and may control meta-information on the mapping segments to be stored in a meta-information storage device including a nonvolatile memory capable of reading and writing in a byte unit.

The control circuit may update the meta-information when the mapping information is updated.

The control circuit may update the meta-information when a command instructing an operation for the mapping segments is received from the host.

The control circuit may update information on an access count for each of the mapping segments, which is included in the meta-information.

The control circuit may update information on parts of the mapping information, which are included in the mapping segments, which is included in the meta-information.

The control circuit may update information on synchronization of each of sub areas included in the memory area, which is included in the meta-information.

In still another aspect, embodiments of the disclosure may provide a meta-information storage device which stores meta-information on a memory area.

The memory area may store mapping segments including some of mapping information between a logical address of a host and a physical address corresponding to the logical address.

The memory area may be disposed externally to a memory system which includes the meta-information storage device.

The meta-information storage device may include a nonvolatile memory capable of reading and writing in a byte unit.

The meta-information may be updated when the mapping information is updated.

The meta-information may be updated when a memory controller of the memory system receives a command instructing an operation for the mapping segments stored in the memory area, from the host.

The meta-information may include information on an access count for each of the mapping segments.

The meta-information may include information on parts of the mapping information which are included in the mapping segments.

The meta-information may include information on synchronization of each of sub areas included in the memory area.

In still another aspect, embodiments of the disclosure may provide a system including a memory system and an external memory.

The memory system may include a memory device suitable for storing mapping information including a plurality of map segments, each map segment including mapping between a logical address and a physical address.

The memory system may include a nonvolatile memory and a memory controller.

The memory controller may load selected mapping segments of the plurality of map segments from the memory device.

The memory controller may control the external memory to store the selected mapping segments.

The memory controller may perform a synchronization operation on the selected mapping segments associated with update of the mapping information.

The memory controller may store meta information on the selected mapping segments in the nonvolatile memory, the meta information including flag information indicating whether each of the selected mapping segments is updated.

According to the embodiments of the disclosure, it is possible to provide a memory system, a memory controller and a meta-information storage device capable of processing a command received from a host as quickly as possible even when an SPO occurs.

Also, according to the embodiments of the disclosure, it is possible to provide a memory system, a memory controller and a meta-information storage device capable of allowing a host to quickly refer to necessary mapping information.

DETAILED DESCRIPTION

Figure 1:
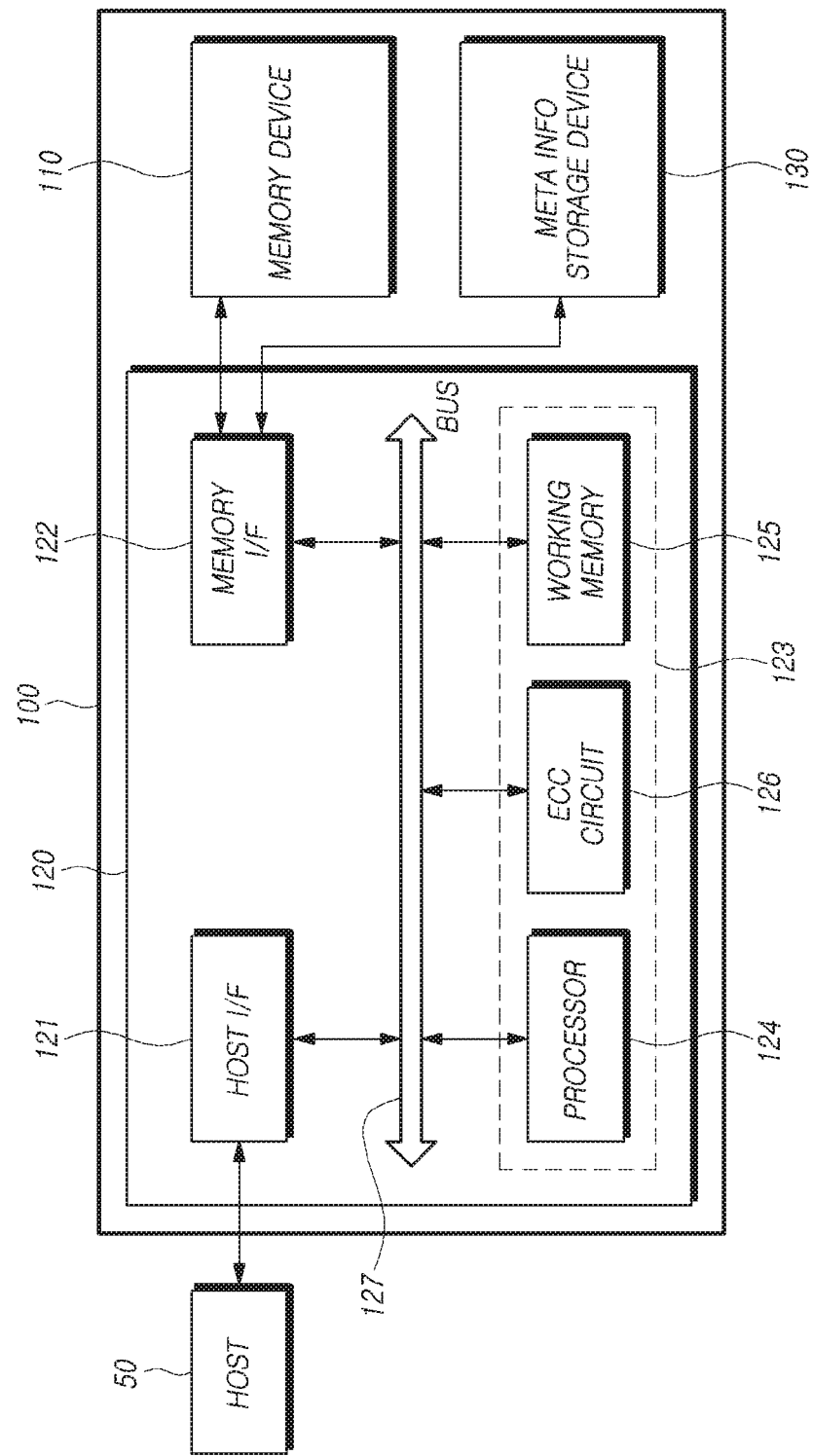
FIG. 1 is a block diagram illustrating a memory system in accordance with an embodiment of the disclosure.

Various embodiments of the disclosure are described in detail below with reference to the accompanying drawings. In the following description, the same elements are designated by the same reference numerals throughout the drawings. Further, in the following description of the disclosure, well-known technical information may be omitted so as not to obscure features and aspects of the present invention. Also, open-ended terms such as "comprising," "having," "including" and the like, used in the description and claims, should not be interpreted as being restricted to the stated elements or operations, unless specifically stated otherwise. Where an indefinite or definite article is used in referring to a singular noun, e.g. "a," "an," "the," this may include a plural of that noun unless specifically stated otherwise.

Also, in describing the components of the disclosure, there may be terms used like first, second, A, B, (a), and (b). These are solely for the purpose of differentiating one component from the other but not to imply or suggest the substances, order, sequence or number of the components.

In describing positional relationships of components, the terms "connected," "coupled" or "linked" may indicate that the is components are directly or indirectly "connected," "coupled" or "linked" with each other.

In describing time flow relationships of operations or events using, for example, "after," "following," "next" or "before," non-continuous cases may be included unless "immediately" or "directly" is used.

In the case where a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

A memory system, a memory controller and a eta-information storage device are described below in detail with reference to the accompanying drawings through various embodiments of the disclosure. Throughout the specification, reference to "an embodiment" or the like is not necessarily to only one embodiment, and different references to any such phrase are not necessarily to the same embodiment(s).

FIG. 1 is a block diagram illustrating a memory system 100 in accordance with an embodiment of the disclosure.

Referring to FIG. 1, the memory system 100 may include a memory device 110 which stores data, a memory controller 120 which controls the memory device 110, and a meta-information (META is INFO) storage device 130.

The memory device 110 includes a plurality of memory blocks and operates in response to the control of the memory controller 120. Operations of the memory device 110 may include, for example, a read operation, a program operation (also referred to as a write operation) and an erase operation.

The memory device 110 may include a memory cell array including a plurality of memory cells which store data. Such a memory cell array may exist in a memory block.

For example, the memory device 110 may be realized by a double data rate (DDR) synchronous dynamic random access memory (SDRAM), a low power double data rate 4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

The memory device 110 may be realized in a three-dimensional array structure. The embodiments of the disclosure may be applied to not only a flash memory device in which a charge storage layer is configured by a conductive floating gate but also a charge trap flash (CTF) in which a charge storage layer is configured is by a dielectric layer.

The memory device 110 is configured to receive a command and an address from the memory controller 120 and access a region in the memory cell array which is selected by the address. In other words, the memory device 110 may perform an operation corresponding to the command, for a region selected by the address.

For example, the memory device 110 may perform a program operation, a read operation and an erase operation. In the program operation, the memory device 110 may program data in a region selected by the address. In the read operation, the memory device 110 may read data from a region selected by the address. In the erase operation, the memory device 110 may erase data stored in a region selected by the address.

The memory controller 120 may control the operation of the memory device 110 according to a request of a host 50 or regardless of a request of the host 50.

In an embodiment, the memory controller 120 may control write (or program), read, erase and background operations for the memory device 110. For example, the background operation may be a garbage collection (GC) operation, a wear leveling (WL) operation, or a bad block management (BBM) operation.

The memory controller 120 may include a host interface (I/F) 121, a memory interface (I/F) 122, and a control circuit 123.

The host interface 121 provides an interface for communication with the host 50. When receiving a command from the host 50, the control circuit 123 may receive the command through the host interface 121, and then, may perform an operation of processing the received command.

The memory interface 122 is coupled with the memory device 110 and thereby provides an interface for communication with the memory device 110. That is to say, the memory interface 122 may be configured to provide the interface between the memory device 110 and the memory controller 120 in response to the control of the control circuit 123.

The control circuit 123 performs the general control operations of the memory controller 120, thereby controlling the operations of the memory device 110. In an embodiment, the control circuit 123 may include at least one of a processor 124 and a working memory 125. The control circuit 123 may further include an error detection and correction circuit (or ECC circuit) 126.

The processor 124 may control general operations of the memory controller 120, and may perform a logic calculation. The processor 124 may communicate with the host 50 through the host interface 121, and may communicate with the memory device 110 through the memory interface 122.

The processor 124 may perform the function of a flash translation layer (FTL). The processor 124 may translate a logical block address (LBA) provided by the host 50, into a physical block is address (PBA), through the flash translation layer (FTL). The flash translation layer (FTL) may receive the logical block address (LBA) and translate it into the physical block address (PBA), by using a mapping table. There are various address mapping methods of the flash translation layer, depending on a mapping unit. Representative address mapping methods include a page mapping method, a block mapping method and a hybrid mapping method.

The processor 124 is configured to randomize data received from the host 50. For example, the processor 124 may randomize data received from the host 50, by using a randomizing seed. Randomized data as data to be stored is provided to the memory device 110 and is programmed to the memory cell array of the memory device 110.

The processor 124 is configured to derandomize data received from the memory device 110, in a read operation. For example, the processor 124 may derandomize data received from the memory device 110, by using a derandomizing seed. Derandomized data may be outputted to the host 50.

The processor 124 may control the operation of the memory controller 120 by executing firmware. In other words, in order to control general operations of the memory controller 120 and perform a logic calculation, the processor 124 may execute (or drive) a firmware loaded to the working memory 125 upon booting. For instance, the firmware may be stored in the memory device 110 and be loaded to the working memory 125.

The firmware as a program executed in the memory system 100 may include, for example, a flash translation layer (FTL), a host interface layer (HIL) and a flash interface layer (FIL). The flash translation layer (FTL) performs a translating function between a logical address requested to the memory system 100 from the host 50 and a physical address of the memory device 110. The host interface layer (HIL) serves to analyze a command requested to the memory system 100 as a storage device from the host 50 and transfers the command to the flash translation layer (FTL). The flash interface layer (FIL) transfers a command instructed from the flash translation layer (FTL) to the memory device 110.

The working memory 125 may store firmware, program code, a command and data to drive the memory controller 120.

The working memory 125, for example, as a volatile memory, may include at least one among a static RAM (SRAM), a dynamic RAM (DRAM) and a synchronous DRAM (SDRAM).

The error detection and correction circuit 126 may be configured to detect an error bit of data stored in the working memory 125 or read data received from the memory device 110 by using an error correction code and correct the detected error bit.

The error detection and correction circuit 126 may be realized to decode data by using an error correction code. The error detection and correction circuit 126 may be realized by any of various code decoders. For example, a decoder which performs unsystematic code decoding or a decoder which performs systematic code decoding may be used.

For example, the error detection and correction circuit 126 may detect an error bit for each read data, in the unit of sector. Namely, each read data may be constituted by a plurality of sectors. A sector may mean a data unit less than a page as a read unit of a flash memory. Sectors constituting each read data may be matched with one another by the medium of an address.

The error detection and correction circuit 126 may calculate a bit error rate (BER), and may determine whether an error is correctable or not, in the unit of sector. For example, in the case where a bit error rate (BER) is greater than a reference value, the error detection and correction circuit 126 may determine a corresponding sector as being uncorrectable or a fail. On the other hand, in the case where a bit error rate (BER) is less than the reference value, the error detection and correction circuit 126 may determine that a corresponding sector is correctable or a pass.

The error detection and correction circuit 126 may perform an error detection and correction operation sequentially for all read data. In the case where a sector in read data is correctable, the error detection and correction circuit 126 may omit an error detection and correction operation for a corresponding sector for next read data. If the error detection and correction operation for all read data is ended in this way, the error detection and correction circuit 126 may detect a sector which is determined to be uncorrectable to be the last. There may be one or more sectors that are determined to be uncorrectable. The error detection and correction circuit 126 may transfer information (for example, address information) on a sector which is determined to be uncorrectable, to the processor 124.

A bus 127 may be configured to provide channels among the components 121, 122, 124, 125 and 126 of the memory controller 120. The bus 127 may include, for example, a control bus for transferring various control signals, and commands, and a data bus for transferring various data.

The above-described components 121, 122, 124, 125 and 126 of the memory controller 120 represent an exemplary configuration only. In some cases, one or more of these components 121, 122, 124, 125 and 126 may be omitted, and/or the functions of one or more such components may be combined into a single component. Of course, as those skilled in the art will recognize, the memory controller 120 may include one or more additional components not illustrated in FIG. 1.

The meta-information storage device 130 may store meta-information on a memory area. In the memory area, there may be stored mapping segments including some of mapping information between logical addresses and physical addresses. The memory area may be disposed in an external device of the memory system 100.

The meta-information storage device 130 may communicate with the memory controller 120 through the memory interface 122.

The meta-information storage device 130 is described below in detail with reference to FIG. 4.

Figure 2:
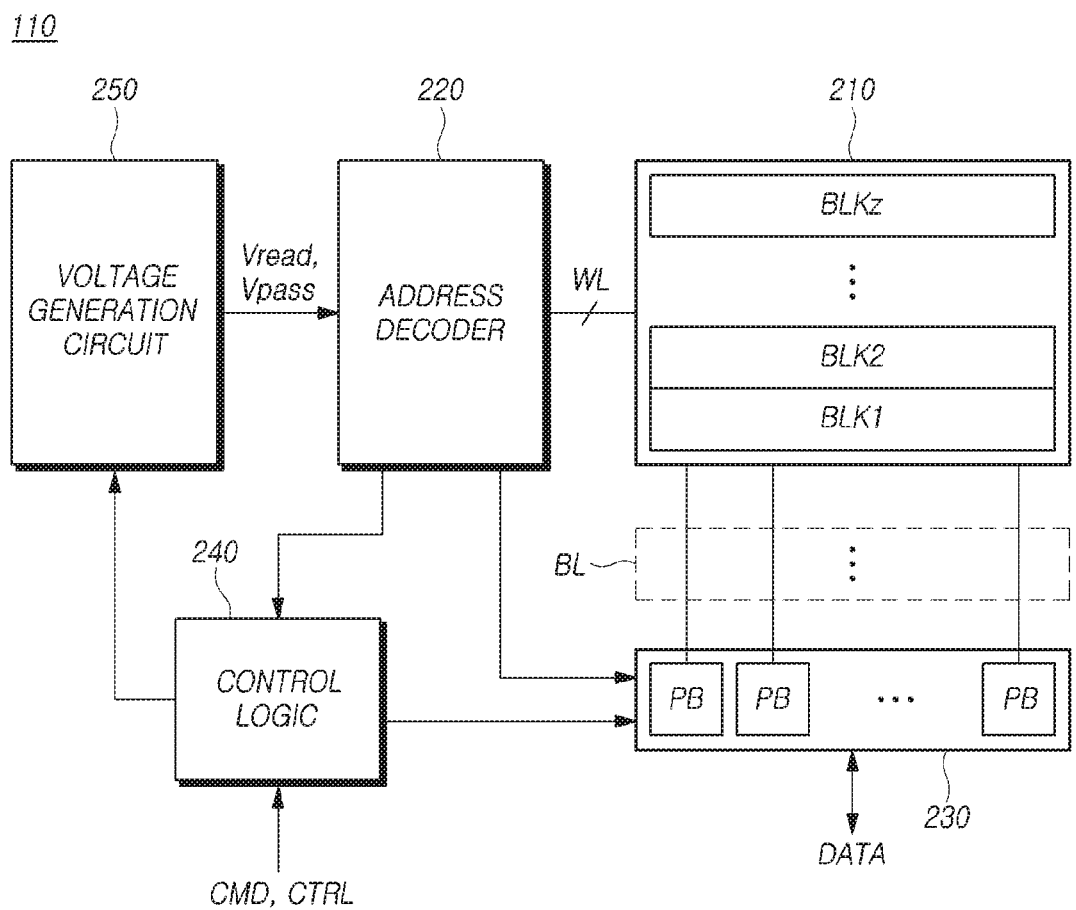
FIG. 2 is a block diagram illustrating a memory device in accordance with an embodiment of the disclosure.

FIG. 2 is a block diagram illustrating the memory device 110 in accordance with an embodiment of the disclosure.

Referring to FIG. 2, the memory device 110 may include a memory cell array 210, an address decoder 220, a read and write circuit 230, control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled to the address decoder 220 through the plurality of word lines WL. The plurality of memory blocks BLK1 to BLKz may be coupled to the read and write circuit 230 through the plurality of bit lines BL.

Each of the plurality of memory blocks BLK1 to BLKz may include a plurality of memory cells. For example, the plurality of memory cells may be nonvolatile memory cells, which may have vertical channel structures. The memory cell array 210 may be configured as a two-dimensional structure. Alternatively, the memory cell array 210 may be configured as a three-dimensional structure.

Each of the plurality of memory cells in the memory cell array may store at least 1-bit data. For instance, each of the plurality of memory cells in the memory cell array 210 may be a signal level cell (SLC) storing 1-bit data. For another instance, each of the plurality of memory cells in the memory cell array 210 may be a multi-level cell (MLC) which stores 2-bit data. For another instance, each of the plurality of memory cells in the memory cell array 210 may be a triple level cell (TLC) which stores 3-bit data. For another instance, each of the plurality of memory cells in the memory cell array 210 may be a quad level cell (QLC) which stores 4-bit data. For still yet another instance, the memory cell array 210 may include a plurality of memory cells each of which stores 5 or more-bit data.

The address decoder 220, the read and writhe circuit 230, the control logic 240 and the voltage generation circuit 250 may collectively operate as a peripheral circuit which drive the memory cell array 210.

The address decoder 220 may be coupled to the memory cell array 210 through the plurality of word lines WL. The address decoder 220 may be configured to operate in response to the control of the control logic 240. The address decoder 220 may receive an address through an input/output buffer (not shown) in the memory device 110.

The address decoder 220 may be configured to decode a block address in the received address. The address decoder 220 may select at least one memory block depending on the decoded block address. During a read operation, the address decoder 220 may apply a read voltage Vread, which is generated by the voltage generation circuit 250, to a word line, which is selected from a memory block, and may apply a pass voltage Vpass to the remaining unselected word lines. Further, during a program verify operation, the address decoder 220 may apply a verify voltage generated by the voltage generation circuit 250 to a word line selected from a selected memory block, and may apply the pass voltage Vpass to the remaining unselected word lines.

The address decoder 220 may be configured to decode a column address in the received address. The address decoder 220 may transmit the decoded column address to the read and write circuit 230.

A read operation and a program operation of the memory device 110 may be performed in the unit of page. An address received when a read operation or a program operation is requested may include a block address, a row address and a column address.

The address decoder 220 may select one memory block and one word line depending on a block address and a row address. A column address may be decoded by the address decoder 220 and be provided to the read and write circuit 230.

The address decoder 220 may include at least one among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 may include a page buffer circuit or a data register circuit. For example, the data register circuit may include a data buffer for performing a data processing function. The data register circuit may further include a cache buffer for performing a caching function.

The plurality of page buffers PB may be coupled to the memory cell array 210 through the plurality of bit lines BL. The plurality of page buffers PB may continuously supply sensing current to bit lines coupled with memory cells to sense the threshold voltages (Vth) of the memory cells in a read operation and a program verify operation. Further, the plurality of page buffers PB may latch sensing data by sensing, through sensing nodes, that the amounts of current flowing depending on the programmed states of the corresponding memory cells are changed. The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory device 110. In an embodiment, the read and write circuit 230 may include a column select circuit in addition to the page buffers (or page registers).

The control logic 240 may be coupled with the address decoder 220, the read and write circuit 230 and the voltage generation circuit 250. The control logic 240 may receive a command CMD and a control signal CTRL through the input/output buffer of the memory device 110.

The control logic 240 may be configured to control general operations of the memory device 110 in response to the control signal CTRL. Further, the control logic 240 may output a control signal for adjusting the precharge potential levels of the sensing nodes of the plurality of page buffers PB.

The control logic 240 may control the read and write circuit 230 to perform a read operation of the memory cell array 210.

The voltage generation circuit 250 may generate the read voltage Vread and the pass voltage Vpass for a read operation in response to a voltage generation circuit control signal outputted from the control logic 240.

Figure 3:
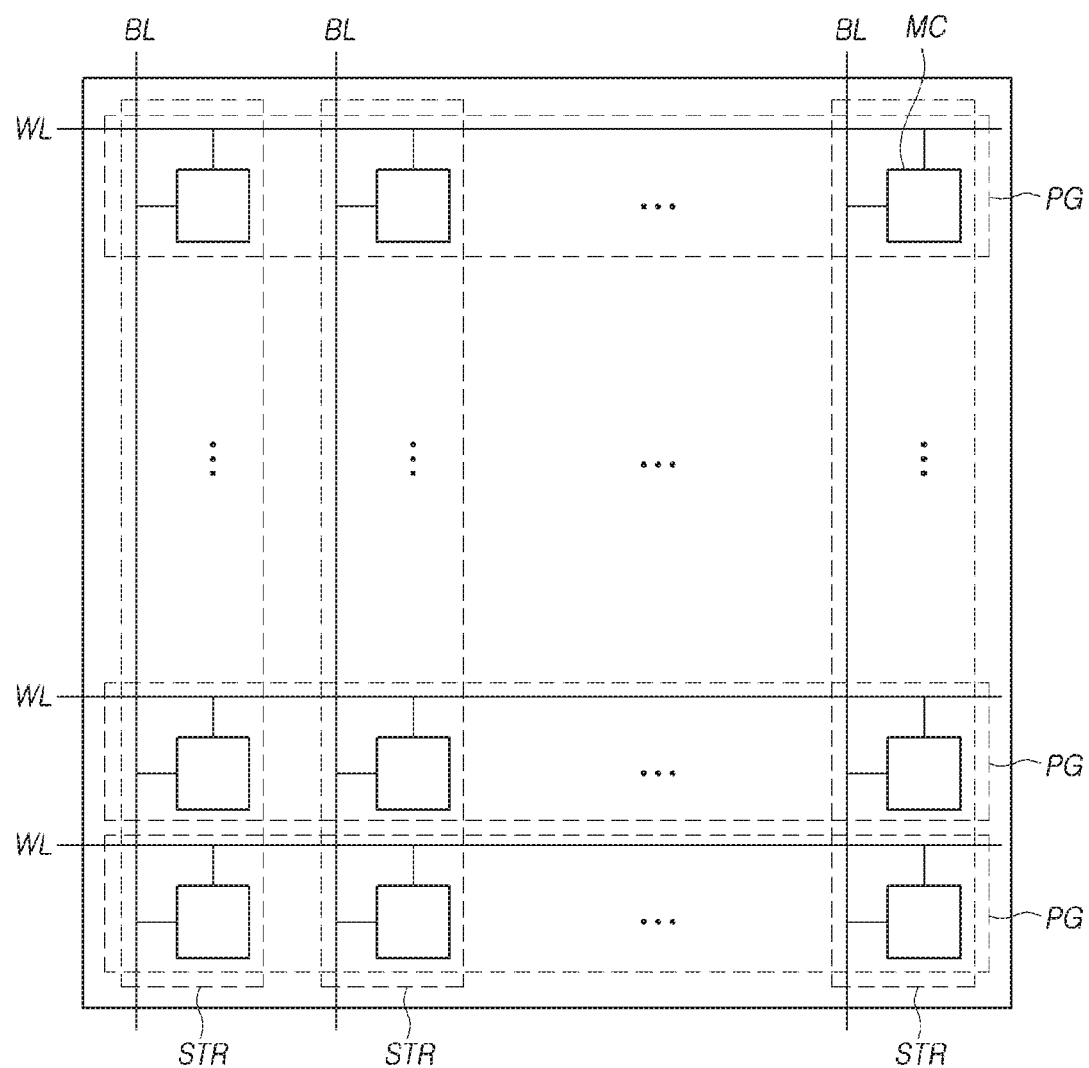
FIG. 3 is a diagram illustrating a memory block of a memory device in accordance with an embodiment of the disclosure.

FIG. 3 is a diagram illustrating one of the plurality of memory blocks BLK1 to BLKz of the memory device 110 in accordance with an embodiment of the disclosure.

Referring to FIG. 3, each of the plurality of memory blocks BLK1 to BLKz in the memory device 110 may be configured as a plurality of pages PG and a plurality of strings STR are disposed in the form of a matrix.

The plurality of pages PG correspond to a plurality of word lines WL, and the plurality of strings STR correspond to a plurality of bit lines BL.

That is to say, in each of the plurality of memory blocks BLK1 to BLKz, the plurality of word lines WL and the plurality of bit lines BL may be disposed to intersect with each other. For example, each of the plurality of word lines WL may be disposed in a row direction, and each of the plurality of bit lines BL may be disposed in a column direction. For another example, each of the plurality of word lines WL may be disposed in a column direction, and each of the plurality of bit lines BL may be disposed in a row direction.

A plurality of memory cells MC may be defined at respective intersections of the word lines WL and bit lines BL. A transistor may be disposed in each memory cell MC. For example, the transistor disposed in each memory cell MC may include a drain, a source and a gate. The drain (or the source) of the transistor may be coupled directly or via one or more other transistors with a corresponding bit line. The source (or the drain) of the transistor may be coupled directly or via one or more other transistors with a source line (which may be the ground). The gate of the transistor may include a floating gate which is surrounded by a dielectric and a control gate to which a gate voltage is applied.

A read operation and a program operation (or write operation) may be performed in the unit of page, and an erase operation may be performed in the unit of memory block.

In each of the plurality of memory blocks BLK1 to BLKz, a first select line (also referred to as a source select line or a drain select line) may be additionally disposed outside a first outermost word line more adjacent to the read and write circuit 230 between two outermost word lines. A second select line (also referred to as a drain select line or a source select line) may be additionally disposed outside a second outermost word line between the two outermost word lines.

At least one dummy word line may be disposed between the first outermost word line and the first select line. At least one dummy word line may also be additionally disposed between the second outermost word line and the second select line.

Figure 4:
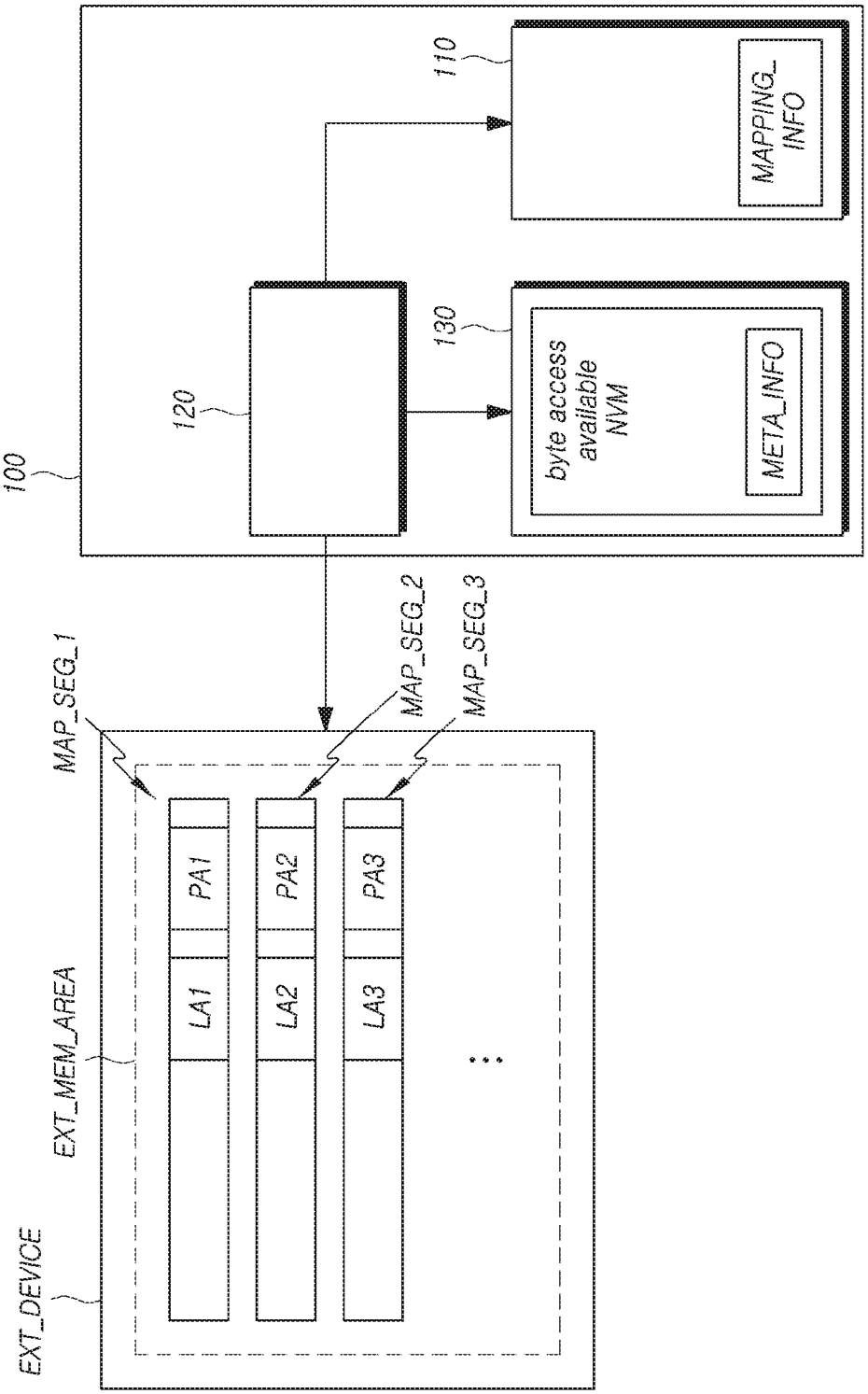
FIG. 4 is a diagram illustrating an example of operations of a memory system in accordance with an embodiment of the disclosure and an external device.

FIG. 4 is a diagram illustrating operations of the memory system 100 in accordance with an embodiment of the disclosure and an external device EXT_DEVICE.

Referring to FIG. 4, the memory controller 120 may cause all or some of mapping information between logical addresses and physical addresses, to be stored in a memory area EXT_MEM_AREA of the external device EXT_DEVICE.

A logical address is an address which is requested to the memory system 100 by the host 50 of FIG. 1. A physical address is an actual address where data is stored in the memory device 110. A physical address may include information on at least one among a die, a plane, a memory block and a page where the associated data is stored.

Mapping information between a logical address and a physical address may mean correspondence between the logical address and the physical address. A unit by which the logical address and the physical address correspond to each other may be a page, a sector, or a block.

The memory device 110 may store data at a physical address corresponding to a logical address of the host 50, and may store mapping information between the logical address and the physical address. The memory device 110 may store the mapping information between the logical address and the physical address, in the form of a mapping table.

The memory controller 120 may load all or some of mapping information between logical addresses and physical addresses, and may cache them in the working memory 125 of the memory controller 120.

The memory area EXT_MEM_AREA may store one or more mapping segments including MAP_SEG_1, MAP_SEG2, and MAP_SEG_3. One mapping segment may include at least one pair of a logical address and a physical address corresponding to each other. For example, the mapping segment MAP_SEG_1 may include a pair of a logical address LA1 and a physical address PAL The mapping segment MAP_SEG_2 may include a pair of a logical address LA2 and a physical address PA2. Pairs of logical addresses and physical addresses in the mapping segments MAP_SEG_1 to MAP_SEG_3 may be referred to by the host 50.

The memory area EXT_MEM_AREA may be positioned in the external device EXT_DEVICE of the memory system 100. For example, the external device EXT_DEVICE may be a device such as an SRAM, a DRAM, an SDRAM and a NAND flash memory which is included in the host 50. For another example, the external device EXT_DEVICE may be a separate storage device which is disposed externally to the host 50.

The memory controller 120 may perform various operations for controlling the memory area EXT_MEM_AREA described above.

For instance, the memory controller 120 may determine whether to activate the memory area EXT_MEM_AREA.

If the memory area EXT_MEM_AREA is activated, the host 50 may refer to the mapping information stored in the memory area EXT_MEM_AREA when transmitting a command to the memory controller 120. The host 50 may check a value of a physical address corresponding to a logical address in a command to be transmitted to the memory controller 120, using the mapping information. The mapping information may be stored in the memory area EXT_MEM_AREA, and may include the value of the corresponding physical address in the corresponding command. When receiving the corresponding command, the memory controller 120 may use the physical address included in the corresponding command, without the need of separately searching for the physical address mapped to the logical address included in the corresponding command. Therefore, the memory controller 120 may quickly process the command received from the host 50.

If the memory area EXT_MEM_AREA is deactivated, the host 50 does not refer to the mapping information stored in the memory area EXT_MEM_AREA when transmitting a command to the memory controller 120. In this case, the memory controller 120 needs to separately search for a physical address mapped to a logical address in the corresponding command.

For another instance, the memory controller 120 may control synchronization between the mapping segments stored in the memory area EXT_MEM_AREA and the aforementioned mapping information.

All or some of the mapping information may be changed by a program operation or a background operation (e.g., garbage collection, read reclaim, or wear leveling). Thus, if mapping segments corresponding to changed parts of the mapping information are stored in the memory area EXT_MEM_AREA, the memory controller 120 needs to update information of the mapping segments corresponding to the changed parts of the mapping information, through synchronization.

If the host 50 refers to a mapping segment which is not synchronized, the host 50 is likely to transmit a command including information on a physical address, which is not actually mapped to a logical address, to the memory controller 120. In this case, overhead may incur due to an operation in which the memory controller 120 determines the matching of the corresponding physical address. In this case, a speed at which the memory controller 120 processes the command received from the host 50 may decrease.

The memory controller 120 may perform such synchronization at various times. For instance, the memory controller 120 may perform the synchronization at every interval, which may be preset. For another instance, the memory controller 120 may perform the synchronization each time a particular event (e.g., when mapping information is changed) occurs.

In order to perform such synchronization, the memory controller 120 may store meta-information META_INFO on the mapping segments stored in the memory area EXT_MEM_AREA. The meta-information META_INFO may mean information indicating states of the mapping segments stored in the memory area EXT_MEM_AREA.

Instead of being stored in an SRAM, a DRAM or the memory device 110, the meta-information META_INFO may be stored in the separate meta-information storage device 130 of the memory system 100.

In this case, the meta-information storage device 130 may include a nonvolatile memory (e.g., a phase-change RAM (PCRAM) or a NOR flash device) capable of being read and written in the unit of byte, and the meta-information META_INFO may be stored in the corresponding nonvolatile memory.

The reason why the meta-information META_INFO is stored in a nonvolatile memory capable of being read and written in the unit of byte is as follows.

Since the meta-information META_INFO indicates the states of the mapping segments stored in the memory area EXT_MEM_AREA, it should match the states of the mapping segments currently stored in the memory area EXT_MEM_AREA.

However, when an unexpected sudden power-off (SPO) occurs in the memory system 100, the meta-information META_INFO may be lost or an error may occur in the meta-information META_INFO. In this case, the synchronization between the mapping segments stored in the memory area EXT_MEM_AREA and the mapping information fails.

Such synchronization failure may become serious, specifically, in the case where an SPO does not occur in the external device EXT_DEVICE in which the memory area EXT_MEM_AREA is positioned but occurs in only the memory system 100.

If SPOs occur in both the memory system 100 and the external device EXT_DEVICE, the host 50 may reset the memory area EXT_MEM_AREA and then notify the memory controller 120 of the reset of the memory area EXT_MEM_AREA so that synchronization is performed.

If an SPO does not occur in the external device EXT_DEVICE but occurs in only the memory system 100, the previously stored mapping segments may remain in the memory area EXT_MEM_AREA as they are, but the mapping information stored in the memory system 100 may be reset or be rolled back to mapping information at a specific time before occurrence of the SPO. As a consequence, synchronization between the mapping segments stored in the memory area EXT_MEM_AREA and the mapping information may be broken.

If this situation occurs, the memory controller 120 needs to reset the memory area EXT_MEM_AREA after boot-up and then check again the state of the memory area EXT_MEM_AREA from the beginning, or needs to check the matching of the memory area EXT_MEM_AREA each time a command is received from the host 50. Due to this fact, a speed at which the memory controller 120 processes a command received from the host 50 may slow down, thereby degrading the entire performance of the memory system 100.

Therefore, the meta-information META_INFO should be stored in a nonvolatile memory so that the meta-information META_INFO is prevented from being lost even when a situation such as an SPO occurs.

The meta-information META_INFO needs to be stored as fast as possible. This is because, if an SPO occurs even while the meta-information META_INFO is stored in the nonvolatile memory, since the possibility for the meta-information META_INFO to be lost or for an error to occur in the meta-information META_INFO still exists, the possibility for an SPO to occur when the meta-information META_INFO is stored needs to be minimized.

The write speed of a nonvolatile memory capable of being read from and written to in byte unit is faster than that of a nonvolatile memory such as a NAND flash device capable of being read to and written from in a page unit. The nonvolatile memory with byte unit read and write capability has less possibility for an SPO to occur during a write operation than the nonvolatile memory with page unit read and write capability. Thus, it is advantageous that the meta-information META_INFO is stored in a nonvolatile memory capable of being read to and written from in a byte unit.

Examples of the meta-information META_INFO which is stored in a nonvolatile memory with byte unit read and write capability are described below in detail. Examples of a time at which the meta-information META_INFO is updated is described in detail with reference to FIGS. 5 and 6, and examples of a type of information included in the meta-information META_INFO is described in detail with reference to FIGS. 7 to 9.

In an embodiment, a time at which the meta-information is META_INFO is updated and a type of information which is included in the meta-information META_INFO do not need to be necessarily fixed, and may be dynamically changed.

Figure 5:
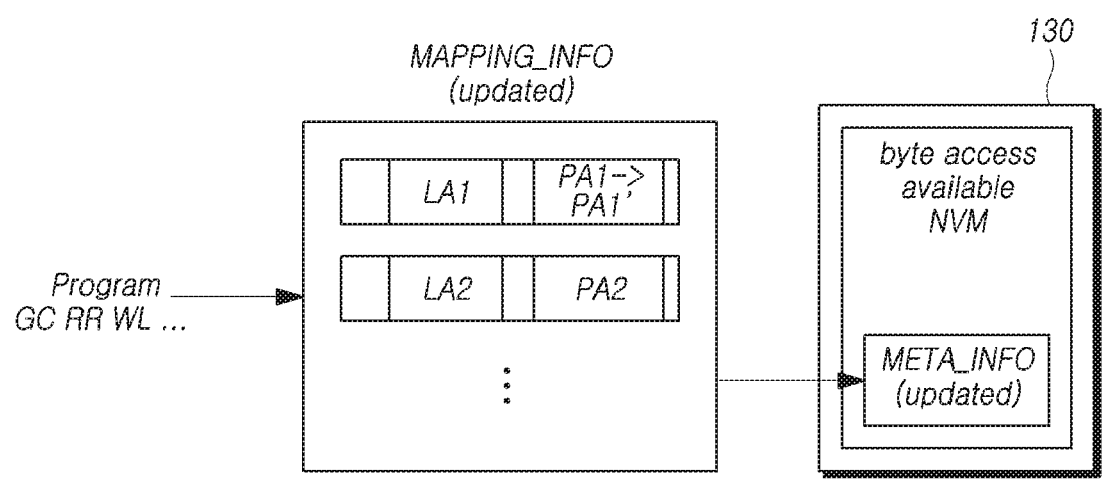
FIGS. 5 and 6 are diagrams illustrating examples in which meta-information is updated in accordance with embodiments of the disclosure.
Figure 6:
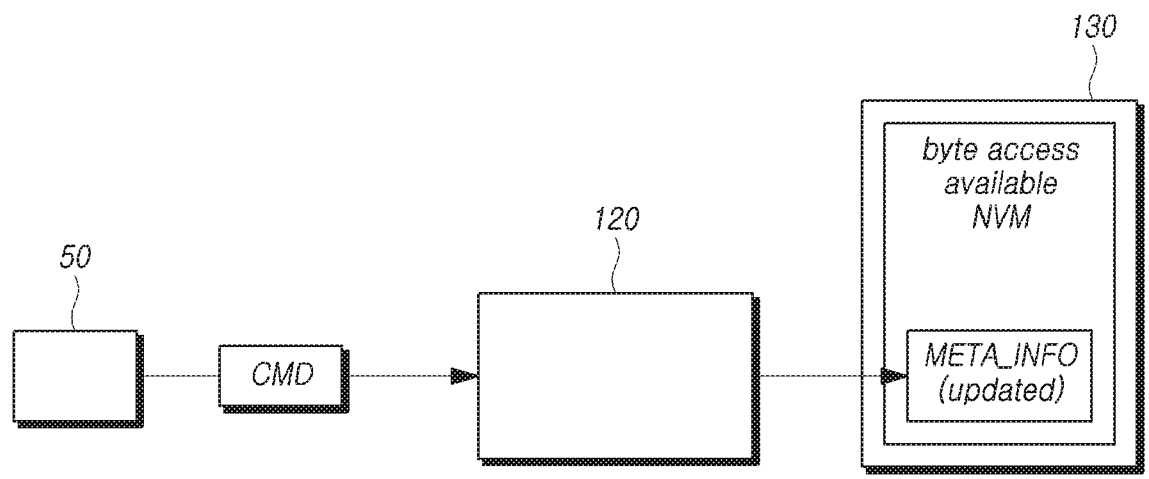

FIGS. 5 and 6 are diagrams illustrating examples in which meta-information META_INFO is updated in accordance with embodiments of the disclosure.

Referring to FIG. 5, the meta-information META_INFO may be updated when mapping information MAPPING_INFO is updated. The memory controller 120 may perform such update.

For instance, mapping information may be updated when a program operation is performed or a background operation (e.g., garbage collection (GC), read reclaim (RR), or wear leveling (WL)) is performed.

When the mapping information MAPPING_INFO is updated in this way, the meta-information META_INFO stored in the meta-information storage device 130 may also be updated. In the example of FIG. 5, if a physical address corresponding to a logical address LA1 is updated from PA1 to PA1', the meta-information META_INFO stored in the meta-information storage device 130 may also be updated.

Referring to FIG. 6, the memory controller 120 may update the meta-information META_INFO when a command which instructs an operation for the memory area EXT_MEM_AREA is received from the host 50.

The corresponding command may be one among 1) a command which instructs an operation of storing some of mapping information in the memory area EXT_MEM_AREA; 2) a command which instructs activation and/or deactivation of a sub area included in the memory area EXT_MEM_AREA; and 3) a command which instructs a reset operation for the memory area EXT_MEM_AREA.

In the case where the meta-information META_INFO is updated as illustrated in FIGS. 5 and 6, since the meta-information META_INFO is stored in the nonvolatile memory in the meta-information storage device 130, the meta-information META_INFO is maintained even in a power-off state. Hence, the memory controller 120 does not need to perform an additional operation for maintaining the meta-information META_INFO, even upon occurrence of an SPO.

Figure 7:
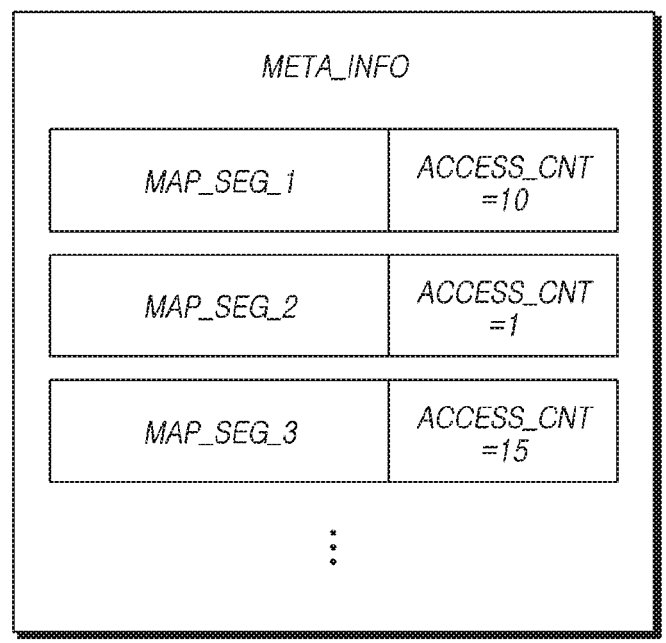
FIGS. 7 to 9 are diagrams illustrating examples of information in meta-information in accordance with embodiments of the disclosure.
Figure 8:
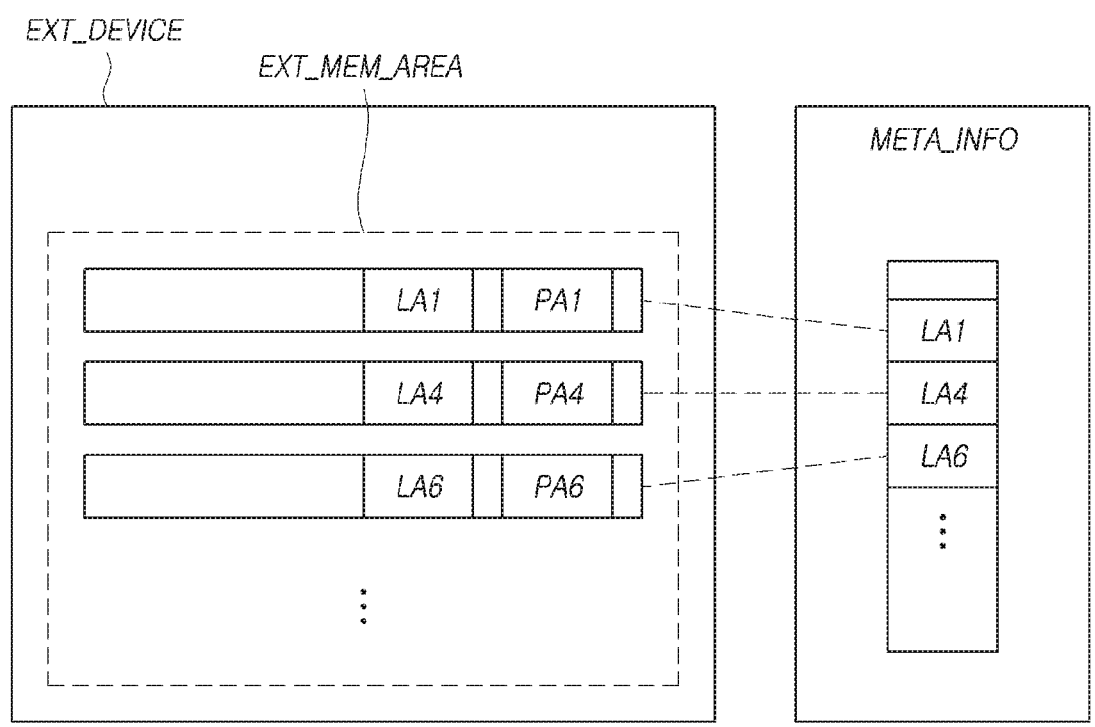
Figure 9:
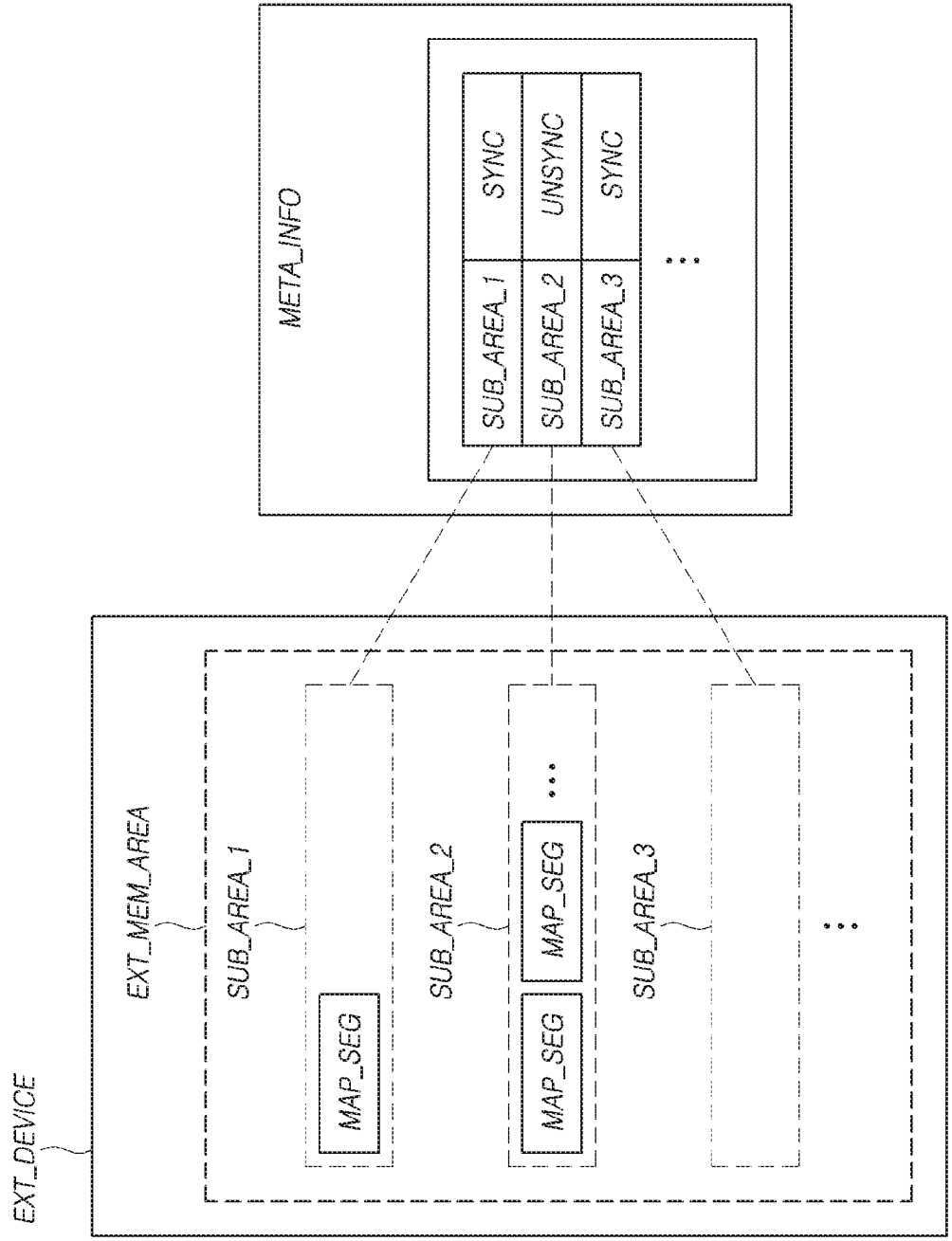

FIGS. 7 to 9 are diagrams illustrating examples of information in the meta-information META_INFO in accordance with embodiments of the disclosure.

Referring to FIG. 7, the meta-information META_INFO may include information on an access count ACCESS_CNT for each of the mapping segments stored in the memory area EXT_MEM_AREA. The memory controller 120 may update the information on an access count ACCESS_CNT for each of the mapping segments, to the meta-information META_INFO.

For instance, the meta-information META_INFO may store an access count ACCESS_CNT of the mapping segment MAP_SEG_1 (which is 10 here), an access count ACCESS_CNT of the mapping segment MAP_SEG_2 (which is 1 here) and an access count ACCESS_CNT of the mapping segment MAP_SEG_3 (which is 15 here).

The information on an access count ACCESS_CNT for each of the mapping segments may indicate which mapping segment is hot and which mapping segment is cold among the mapping segments.

Based on the information on an access count ACCESS_CNT, the memory controller 120 may check a frequency at which a mapping segment stored in the memory area EXT_MEM_AREA is accessed by the host 50.

If a frequency at which a mapping segment stored in the memory area EXT_MEM_AREA is accessed by the host 50 is greater than or equal to a threshold frequency, the memory controller 120 may continuously activate the memory area EXT_MEM_AREA.

If a frequency at which a mapping segment stored in the memory area EXT_MEM_AREA is accessed by the host 50 is less than the threshold frequency, the memory controller 120 may deactivate the memory area EXT_MEM_AREA or may change the mapping segment stored in the memory area EXT_MEM_AREA.

Referring to FIG. 8, the meta-information META_INFO may include information on which part of the mapping information is stored in the memory area EXT_MEM_AREA. The memory controller 120 may update information on a part of a mapping segment among the mapping information, to the meta-information META_INFO.

For instance, mapping information between a logical address LA1 and a physical address PA1, between a logical address LA4 and a physical address PA4 and between a logical address LA6 and a physical address PA6 is stored in the memory area EXT_MEM_AREA.

The meta-information META_INFO may include information that the mapping information corresponding to the logical address LA1, the logical address LA4 and the logical address LA6 is stored in the memory area EXT_MEM_AREA.

Referring to FIG. 9, the meta-information META_INFO may include synchronization information on each of sub areas included in the memory area EXT_MEM_AREA. The memory controller 120 may update the synchronization information on each of the sub areas included in the memory area EXT_MEM_AREA, to the eta-information META_INFO.

The memory area EXT_MEM_AREA may include one or more sub areas. For instance, the memory area EXT_MEM_AREA may include a sub area SUB_AREA_1, a sub area SUB_AREA_2 and a sub area SUB_AREA_3. Each of SUB_AREA_1 and SUB_AREA_2 may include at least one mapping segment MAP_SEG. However, SUB_AREA_3 may not include any mapping segment MAP_SEG.

The memory controller 120 may determine which sub area is to be synchronized, based on the synchronization information on the respective sub areas in the meta-information META_INFO.

In the example of FIG. 9, the meta-information META_INFO indicates that the sub area SUB_AREA_1 and the sub area SUB_AREA_3 are in a synchronization-completed state SYNC and the sub area SUB_AREA_2 is in a synchronization-uncompleted state UNSYNC. Therefore, the memory controller 120 may perform a synchronization task for only the mapping segment MAP_SEG in the sub area SUB_AREA_2, by referring to the meta-information META_INFO.

An SPO may occur even while the meta-information META_INFO is updated to the meta-information storage device 130. Thus, the memory controller 120 needs to check whether an SPO has occurred while updating the meta-information META_INFO to the meta-information storage device 130.

If an SPO has occurred while the meta-information META_INFO is updated to the meta-information storage device 130, the meta-information META_INFO stored is highly unlikely to accurately reflect a current state of the memory area EXT_MEM_AREA. Therefore, the memory controller 120 may change the meta-information META_INFO to match the current state of the memory area EXT_MEM_AREA.

Figure 10:
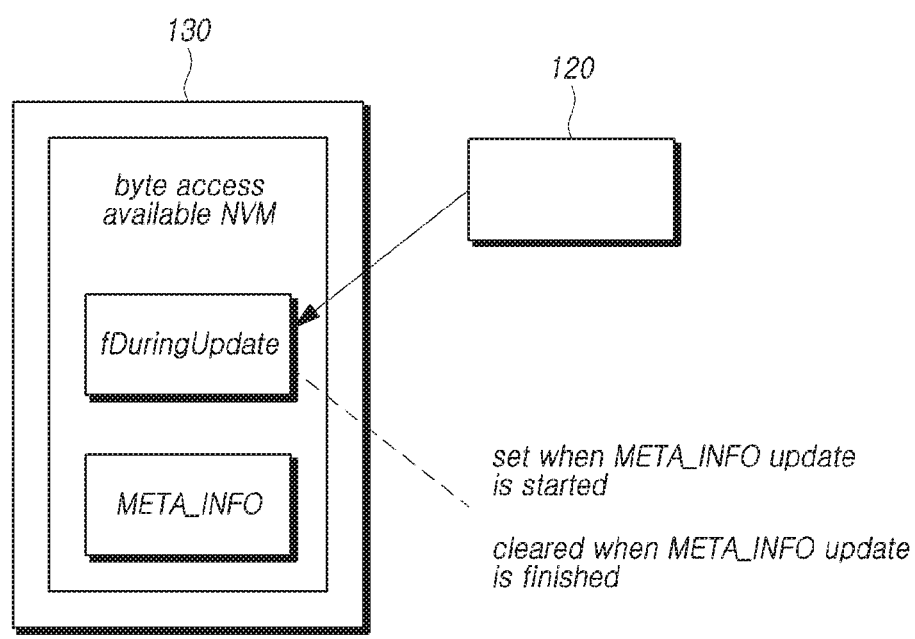
FIG. 10 is a diagram illustrating an example of flag information indicating that meta-information is being updated, in accordance with an embodiment of the disclosure.
Figure 11:
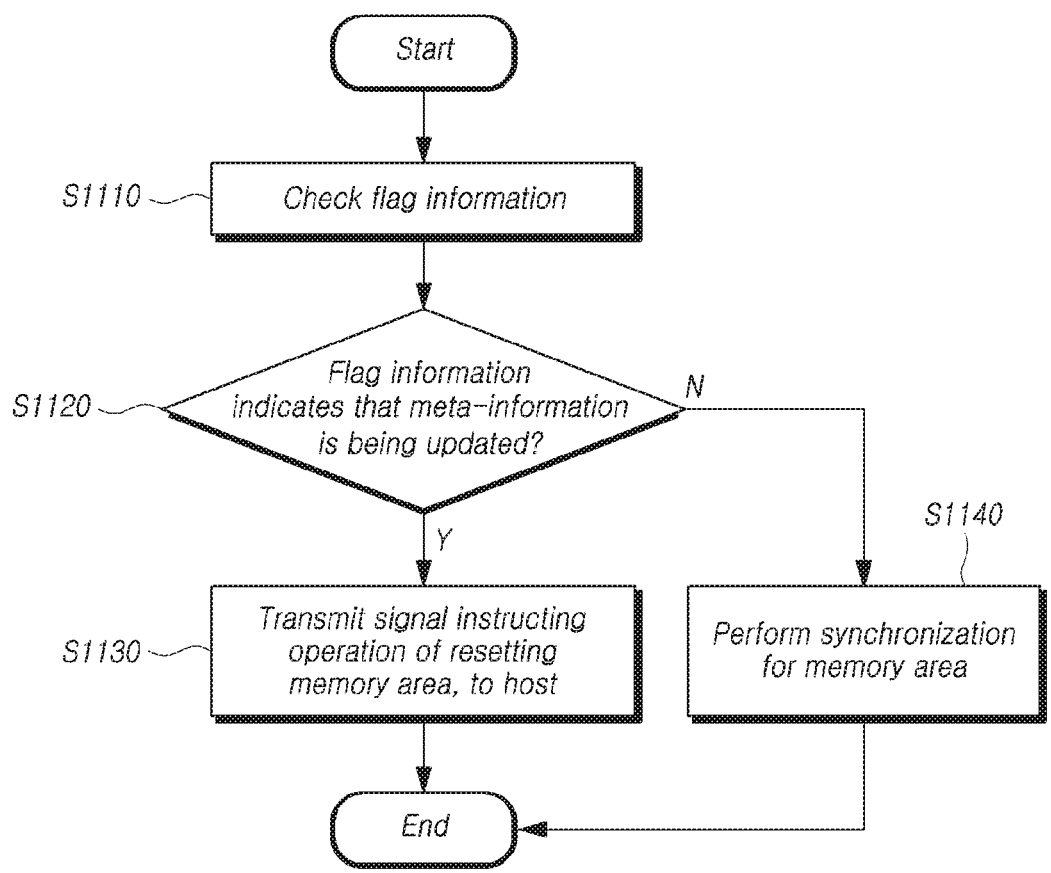
FIG. 11 is a flow chart illustrating a method for operating a memory controller depending on the flag information of FIG. 10.

To this end, FIGS. 10 and 11 illustrate an example in which flag information indicating whether the meta-information META_INFO is being updated to the meta-information storage device 130 is used.

FIG. 10 is a diagram illustrating an example of flag information indicating that meta-information is being updated, in accordance with an embodiment of the disclosure.

Referring to FIG. 10, not only the meta-information META_INFO but also flag information indicating whether the meta-information META_INFO is being updated (fDuringUpdate) may be stored in the nonvolatile memory. The nonvolatile memory is capable of being read and written in the unit of byte, which is included in the meta-information storage device 130. The memory controller 120 may generate the flag information fDuringUpdate indicating whether the meta-information META_INFO is being updated. Further, the memory controller 120 may store the flag information (fDuringUpdate) in the meta-information storage device 130.

Specifically, the memory controller 120 may set the corresponding flag information (fDuringUpdate) before updating the meta-information META_INFO to the meta-information storage device 130. Further, the memory controller 120 may clear the corresponding flag information (fDuringUpdate) when the update of the meta-information META_INFO is completed. For example, a value of 1 indicates that the corresponding flag information is in the set state and a value of 0 indicates that the corresponding flag information is in the clear state. This indicating convention may be reversed.

Therefore, if an SPO occurs while the meta-information META_INFO is updated to the meta-information storage device 130, since the corresponding flag information (fDuringUpdate) is not cleared by the memory controller 120, such flag information is in the set state. Thus, by checking that the corresponding flag information (fDuringUpdate) is set, the memory controller 120 may determine that an SPO has occurred while the meta-information META_INFO is updated.

Various methods may be used by the memory controller 120 to change (or update) the meta-information META_INFO to match the current state of the memory area EXT_MEM_AREA.

For instance, the memory controller 120 may change the meta-information META_INFO by checking a state of the memory area EXT_MEM_AREA through a command received from the host 50. However, if this method is used, an overhead to perform an operation for checking a state of the entire memory area EXT_MEM_AREA increases.

For another instance, the memory controller 120 may transmit a signal which instructs an operation of resetting the memory area EXT_MEM_AREA, to the host 50. In this case, the memory controller 120 only needs to initialize the meta-information META_INFO stored in the meta-information storage device 130, without the need of separately checking a current state of the memory area EXT_MEM_AREA. The host 50 may receive the corresponding signal and may reset the memory area EXT_MEM_AREA.

FIG. 11 is a flow chart illustrating a method for operating the memory controller 120 depending on the flag information of FIG. 10.

Referring to FIG. 11, the memory controller 120 checks the flag information (fDuringUpdate) which is stored in the meta-information storage device 130 (S1110).

The memory controller 120 determines whether the corresponding flag information (fDuringUpdate) indicates that the meta-information META_INFO is being updated (S1120).

When it is determined that the corresponding flag information (fDuringUpdate) indicates that the meta-information META_INFO is being updated (S1120-Y), the memory controller 120 may determine that an SPO has occurred while the meta-information META_INFO is updated. Therefore, the memory controller 120 may transmit a signal which instructs an operation of resetting the memory area EXT_MEM_AREA, to the host 50, to match a current state of the memory area EXT_MEM_AREA (S1130).

When it is determined that the corresponding flag information (fDuringUpdate) does not indicate that the meta-information META_INFO is being updated (S1120-N), the memory controller 120 may determine that update of the meta-information META_INFO is properly completed. Therefore, the memory controller 120 may perform synchronization for the memory area EXT_MEM_AREA according to the updated meta-information META_INFO (S1140).

The above-described operation of the memory controller 120 may be controlled by the control circuit 123, and may be performed in such a manner that the processor 124 executes (or drives) firmware in which all operations of the memory controller 120 are programmed.

Figure 12:
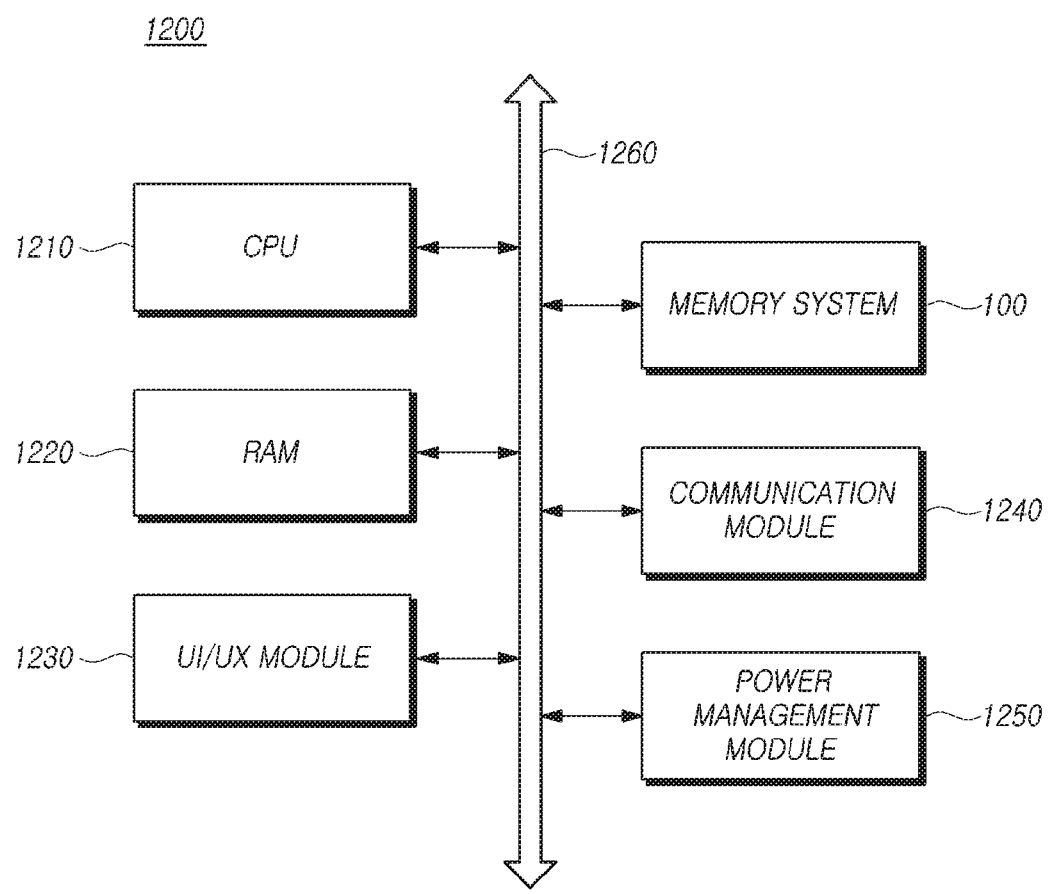
FIG. 12 is a block diagram illustrating an example of a computing system in accordance with an embodiment of the disclosure.

FIG. 12 is a block diagram illustrating a computing system 1200 in accordance with an embodiment of the disclosure.

Referring to FIG. 12, the computing system 1200 may include a memory system 100, a central processing unit (CPU) 1210, a random access memory (RAM) 1220, a user interface/user experience (UI/UX) module 1230, a communication module 1240 and a power management module 1250, which are electrically coupled to a system bus 1260. The central processing unit (CPU) 1210 may control general operations of the computing system 1200. The RAM 1220 may store data and information related with operations of the computing system 1200. The UI/UX module 1230 may provide use environment to a user. The communication module 1240 may communicate with an external device in a wired and/or wireless manner. The power management module 1250 may manage power used by the computing system 1200.

The computing system 1200 may include a personal computer (PC), a mobile terminal such as a smartphone and a tablet or various other electronic devices.

The computing system 1200 may further include a battery for supplying an operating voltage, an application chipset, a graphic-related module, a camera image processor (CIS), and a dynamic RAM (DRAM). As those skilled in the art will understand the computing system 1200 may include other components.

The memory system 100 may include not only a device which stores data in a magnetic disk, such as a hard disk drive (HDD), but also a device which stores data in a nonvolatile memory, such as a solid state drive (SDD), a universal flash storage (UFS) device and an embedded MMC (eMMC) device. The nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM). In addition, the memory system 100 may be realized as any of various types of storage devices, and may be mounted in any of various electronic devices.

As is apparent from the above description, according to embodiments of the disclosure, it is possible to provide a memory system, a memory controller and a meta-information storage device capable of quickly processing a command received from a host even when an SPO occurs.

Also, according to embodiments of the disclosure, it is possible to provide a memory system, a memory controller and a meta-information storage device capable of allowing a host to quickly refer to necessary mapping information.

Although various embodiments of the disclosure have been illustrated and described, those skilled in the art will appreciate in light of the present disclosure that various modifications, additions and substitutions are possible, without departing from the scope and is spirit of the disclosure. Therefore, the disclosed embodiments should be considered in a descriptive sense only and not for limiting the scope of the invention. The scope of the invention is defined by the appended claims and their equivalents.

What is claimed is:

1. A memory system comprising:
a memory device configured to store data at a physical address corresponding to a logical address of a host, and store mapping information between the logical address and the physical address;
a memory controller configured to control the memory device and a memory area of the host in which mapping segments including some of the mapping information are stored and which is disposed externally to the memory system; and
a meta-information storage device, including a nonvolatile memory capable of reading and writing in a byte unit, configured to store meta-information on the mapping segments stored in the memory area,
wherein the memory controller controls synchronization between the mapping segments stored in the memory area and the mapping information when an SPO (sudden power-off) occurs in the memory system, and
wherein the memory controller determines whether to activate the memory area so that the host refers to the mapping information stored in the memory area.

2. The memory system according to claim 1, wherein the memory controller updates the meta-information when the mapping information is updated.

3. The memory system according to claim 1, wherein the memory controller updates the meta-information when a command instructing an operation for the mapping segments is received from the host.

4. The memory system according to claim 1, wherein the memory controller updates information on an access count for each of the mapping segments, which is included in the meta-information.

5. The memory system according to claim 1, wherein the memory controller updates information on parts of the mapping information which are included in the mapping segments, which is included in the meta-information.

6. The memory system according to claim 1, wherein the memory controller updates information on synchronization of each of sub areas included in the memory area, which is included in the meta-information.

7. The memory system according to claim 1, wherein the memory controller generates flag information indicating whether the meta-information is being updated, and stores the flag information in the meta-information storage device.

8. The memory system according to claim 7, wherein the memory controller checks the flag information, and, when it is determined that the flag information indicates that the meta-information is being updated, transmits a signal which instructs an operation of resetting the memory area, to the host.

9. The memory system according to claim 1, wherein the memory controller determines whether to activate or deactivate the memory area based on a frequency at which the mapping segments stored in the memory area are accessed.

10. A memory controller comprising:
a memory interface configured to communicate with a memory device which stores data at a physical address corresponding to a logical address of a host and stores mapping information between the logical address and the physical address; and
a control circuit configured to control the memory device and a memory area of the host in which mapping segments including some of the mapping information are stored and which is disposed externally to a memory system that includes the control circuit and the memory device, wherein the control circuit controls synchronization between the mapping segments stored in the memory area and the mapping information when an SPO (sudden power-off) occurs in the memory system, and controls meta-information on the mapping segments, to be stored in a meta-information storage device comprising a nonvolatile memory capable of reading and writing in a byte unit, and wherein the control circuit determines whether to activate the memory area so that the host refers to the mapping information stored in the memory area.

11. The memory controller according to claim 10, wherein the control circuit updates the meta-information when the mapping information is updated.

12. The memory controller according to claim 10, wherein the control circuit updates the meta-information when a command instructing an operation for the mapping segments is received from the host.

13. The memory controller according to claim 10, wherein the control circuit updates information on an access count for each of the mapping segments, which is included in the meta-information.

14. The memory controller according to claim 10, wherein the control circuit updates information on parts of the mapping information which are included in the mapping segments, which is included in the meta-information.

15. The memory controller according to claim 10, wherein the control circuit updates information on synchronization of each of sub areas included in the memory area, which is included in the meta-information.

16. A meta-information storage device suitable for storing meta-information on a memory area of a host, the meta-information storage device comprising:
   a nonvolatile memory capable of reading and writing in a byte unit, used to minimize the possibility of an SPO (Sudden Power-Off) to occur while the meta-information is storing in the meta-information storage device,
   wherein the memory area is disposed externally to a memory system which includes the meta-information storage device, and stores mapping segments including some of mapping information between a logical address of the host and a physical address corresponding to the logical address, and
   wherein the memory area is activated by the memory system so that the host refers to the mapping information stored in the memory area.

17. The meta-information storage device according to claim 16, wherein the meta-information is updated when the mapping information is updated.

18. The meta-information storage device according to claim 16, wherein the meta-information is updated when a memory controller of the memory system receives a command instructing an operation for the mapping segments stored in the memory area, from the host.

19. The meta-information storage device according to claim 16, wherein the meta-information includes information on an access count for each of the mapping segments.

20. The meta-information storage device according to claim 16, wherein the meta-information includes information on parts of the mapping information which are included in the mapping segments.

* * * * *